United States Patent [19]
Munnoch et al.

[11] Patent Number: 6,059,309
[45] Date of Patent: *May 9, 2000

[54] SEAT ASSEMBLY FOR A PEDESTRIAN OPERABLE SUCTION SWEEPING MACHINE

[75] Inventors: Peter Alexander Clarence Munnoch, Alloa; Dawson Sellar, Bank Head, both of United Kingdom

[73] Assignee: Applied Sweepers Limited, Falkirk, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/048,353

[22] Filed: Mar. 26, 1998

[30] Foreign Application Priority Data

Mar. 27, 1997 [GB] United Kingdom ............... 9706382

[51] Int. Cl.7 ....................................................... B62B 1/00
[52] U.S. Cl. ............................................ 280/652; 280/32.7
[58] Field of Search ............................ 280/63, 647, 650, 280/651, 652, 656, 657, 32.7, 33.992, 33.993, 422; 180/11, 12, 13, 16; 297/217.3, 217.6

[56] References Cited

U.S. PATENT DOCUMENTS

| | | | |
|---|---|---|---|
| D. 337,850 | 7/1993 | Berends | D26/138 |
| 1,085,737 | 2/1914 | Janus | 280/32.7 |
| 1,187,907 | 6/1916 | Hanson | 280/32.7 |
| 2,740,462 | 4/1956 | Stegeman | 280/647 |
| 3,190,672 | 6/1965 | Swanson et al. | 280/32.7 |
| 3,485,314 | 12/1969 | Herr | 280/32.7 |
| 3,696,334 | 10/1972 | Demeter | 340/432 |
| 3,738,440 | 6/1973 | Storm | 180/13 |
| 4,010,507 | 3/1977 | Johnson | 280/32.7 |
| 4,058,720 | 11/1977 | Renfrow | 362/549 |
| 4,096,920 | 6/1978 | Heyn | 180/11 |
| 4,192,525 | 3/1980 | Clark | 280/32.7 |
| 4,204,191 | 5/1980 | Daniels | 340/432 |
| 4,282,566 | 8/1981 | Newman | 362/369 |
| 4,305,602 | 12/1981 | Ungvari et al. | 280/656 |
| 4,331,346 | 5/1982 | Walters | 280/414.1 |
| 4,362,316 | 12/1982 | Wright | 280/656 |
| 4,511,155 | 4/1985 | Galloway | 280/204 |
| 4,625,981 | 12/1986 | Marchionne | 280/63 |
| 4,692,845 | 9/1987 | Widhalm et al. | 362/485 |
| 4,702,519 | 10/1987 | Lobanoff | 297/217.6 |
| 4,709,771 | 12/1987 | Basham et al. | 180/6.5 |
| 4,828,282 | 5/1989 | Pinto | 280/32.7 |
| 4,989,351 | 2/1991 | Shear | 280/32.7 |
| 4,998,948 | 3/1991 | Osterling | 280/32.7 |
| 5,011,170 | 4/1991 | Forbes et al. | 280/204 |
| 5,106,108 | 4/1992 | Howell | 280/1.5 |
| 5,118,123 | 6/1992 | Betrock | 280/32.7 |
| 5,368,325 | 11/1994 | Hazen | 280/32.7 |
| 5,388,850 | 2/1995 | Simone | 280/442 |
| 5,662,302 | 9/1997 | Berry, Jr. | 248/317 |
| 5,769,449 | 6/1998 | Keesee | 280/656 |
| 5,785,453 | 7/1998 | Marty et al. | 280/32.7 |
| 5,791,716 | 8/1998 | Bryant et al. | 297/217.6 |
| 5,947,490 | 9/1999 | Munnoch et al. | 280/32.7 |
| 5,950,891 | 9/1999 | Brungardt et al. | 224/497 |

FOREIGN PATENT DOCUMENTS

| | | |
|---|---|---|
| 0 867 331 | 9/1998 | European Pat. Off. . |
| 1070580 | 7/1954 | France . |
| 2 301 071 | 11/1996 | United Kingdom . |

*Primary Examiner*—Lanna Mai
*Assistant Examiner*—Andrew J. Fischer
*Attorney, Agent, or Firm*—Harter, Secrest & Emery LLP; Stephen B. Salai, Esq.; Brian B. Shaw, Esq.

[57] ABSTRACT

A seat assembly for a pedestrian operable suction sweeping machine comprising a telescopic chassis 1,3, supported on a caster wheel 17 and having a fold away seat arrangement 19 including a seat 20 supported on a seat plate 22. The assembly is provided with a pair of rearwardly facing lights 29,31 and a flashing or hazard warning light 47, the lights being supported on support arms 37 of a light frame 34 and the light 47 on a swing bracket 49 so that when the seat assembly is folded away for pedestrian operation of the machine, the lights can be folded into a stowed position to either side of the seat 20. The lights are preferably powered from a power source on the machine and wiring 53 for the lights is entrained around a dolly 57 to allow extension of the chassis 1,3.

5 Claims, 8 Drawing Sheets

SEAT ASSEMBLY FOR A PEDESTRIAN OPERABLE SUCTION SWEEPING MACHINE

The present invention relates to a seat assembly for a pedestrian operable suction sweeping machine.

Pedestrian operable suction sweeping machines are now becoming fairly common place in town centres, shopping malls and like locations for sweeping up litter on pavements and in pedestrian only areas etc. and one such machine is known as THE GREEN MACHINE™ and is the subject of our U.K. Patent No. 2287418 B. The THE GREEN MACHINE suction sweeping machine has proved commercially successful and is now sold with a ride-on seat for the operator, thus allowing the operator to cover large areas at reasonably high speed, should circumstances allow. The ride-on seat is the subject of U.K. Patent Application No. 2301071 A, and when the machine operator wishes to walk behind the machine rather than use the seat, the seat folds to a storage position and a chassis on which the seat is pivotally supported can be telescopically collapsed to a stowage position beneath a rear end of the machine.

Often, suction sweeping machines of the above pedestrian operable type are used for cleaning pavements in high streets and like locations and from time to time as well as being operated for cleaning the pavement, the machines are used in the high street itself to sweep up rubbish from the gutters. Also, of course, from time to time, the machine has to be moved from the depot to its position of use and if a trailer is not used, the machine can be driven there under its own power from a depot with the operator using the seat. The law requires that such suction sweeping machines be fitted with front and rear lights. Certain ride-on garden machinery, such as garden tractors are known which are fitted with forwardly facing driving lights but these machines do not have rearwardly facing lights because there is no requirement for them. Of course, vehicles with rearwardly facing lights are well known and it is also known to provide lighting bars which are removably connectable to trailers, caravans, horse boxes and the like. Obviously, it would be possible to provide rearwardly facing lights on a suction sweeping machine by means of a demountable lighting bar. However, the problem with this is that when the machine is to be used in pedestrian mode, the lighting bar would have to be removed and stowed somewhere on the machine. This would be at the least inconvenient and possibly extremely difficult to achieve.

The present invention seeks to provide a solution to the above problem.

According to the present invention, we provide a seat assembly for a pedestrian operable suction sweeping machine, the seat assembly having a chassis, connector means at or adjacent the front of the chassis, by which it is connectable to the machine, a seat supported on the chassis, at least one support wheel carried by the chassis, and two rearwardly facing lights pivotally supported on the seat and moveable between an extended position of use and a folded away position.

Preferably, the seat is pivotally supported on the chassis, and moveable between an extended position of use and a folded away position.

Preferably the chassis is extendable between a stowage position and a position of use.

Preferably, the two lights are mounted on support arms forming part of a generally U-shaped frame foldably supported on a support plate for the seat and moveable between an extended operative position and a folded position in which the seat can be moved to its folded away position.

Preferably the lights are powered from a power source on the suction sweeping machine and are therefore connected to electrical wiring supported on the chassis, storage means being provided on the chassis to accommodate the wiring when the chassis is moved between its stowage position and position of use.

Preferably, the storage means comprises a pulley around which the wiring is entrained, the pulley being supported on a spring loaded dolly carried by the chassis. By this means, the excess cable which would otherwise build-up when the chassis is moved to its stowage position can be successfully stored.

Preferably, the chassis is of cruciform shape in plan, with a cross member and a longitudinal member, the latter being of telescopic construction to allow the chassis to be moved between its storage position and position of use, and the seat is pivotally supported on a rear end of the longitudinal member.

Preferably, the dolly comprises a rail extending lengthwise of the cross member, a carriage or slider on the rail on which slider the pulley is supported, and biassing means biassing the slider to one end of the rail.

Preferably, a hazard warning light is associated with the two lights. This may be provided on a folding extension bracket supported on one of the support arms.

Preferably also, the U-shaped frame with its support arms for the lights is pivotally supported on the seat support plate, and pivotally supports a registration plate, which is provided with an illuminating light.

A seat assembly for a pedestrian operable sweeping machine according to the present invention is now described by way of example with reference to the accompanying drawings in which.

Figure 1:
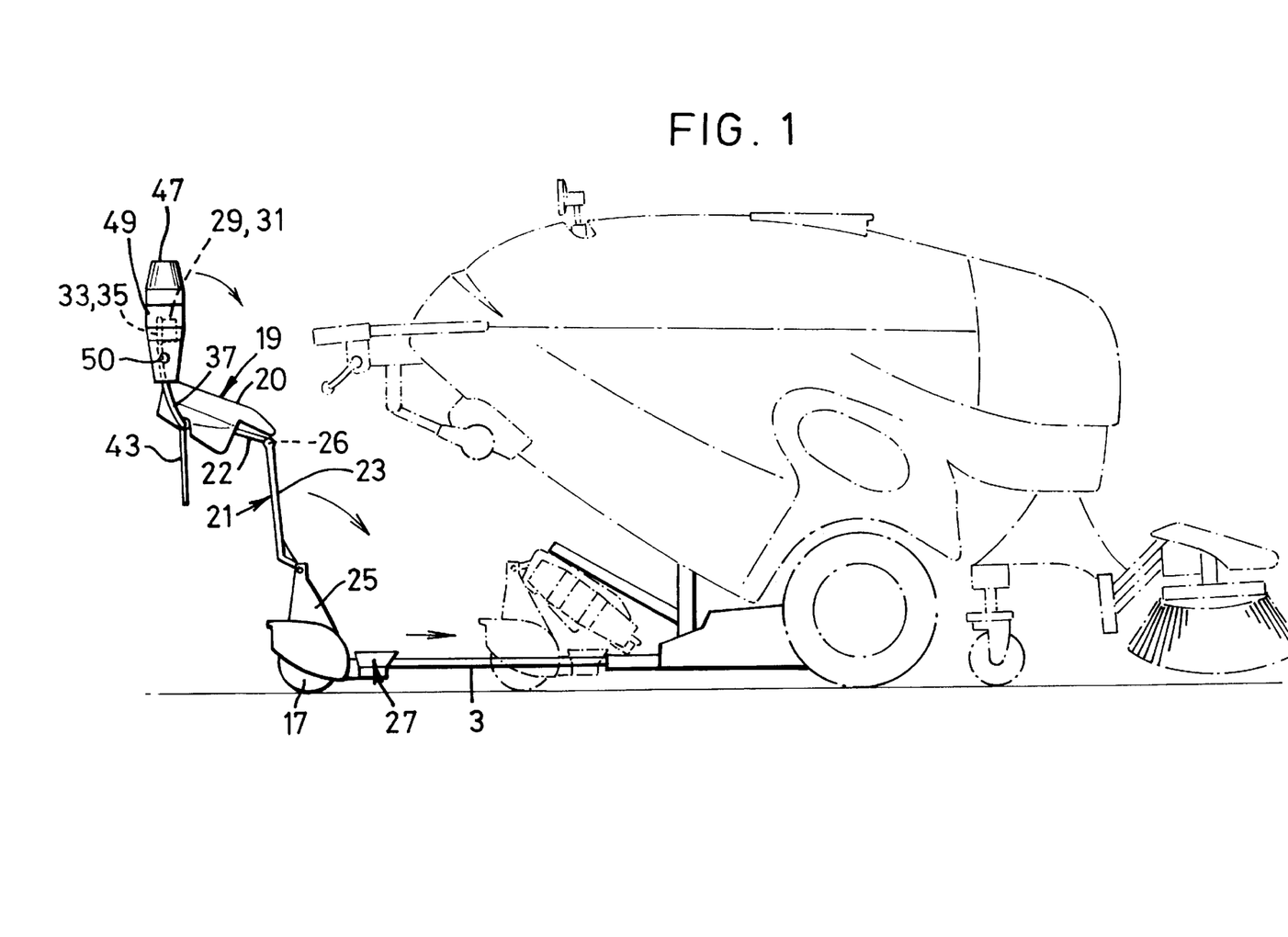
FIG. 1 is a diagrammatic side view of a sweeping machine with the seat assembly shown in its position of use.
Figure 2:
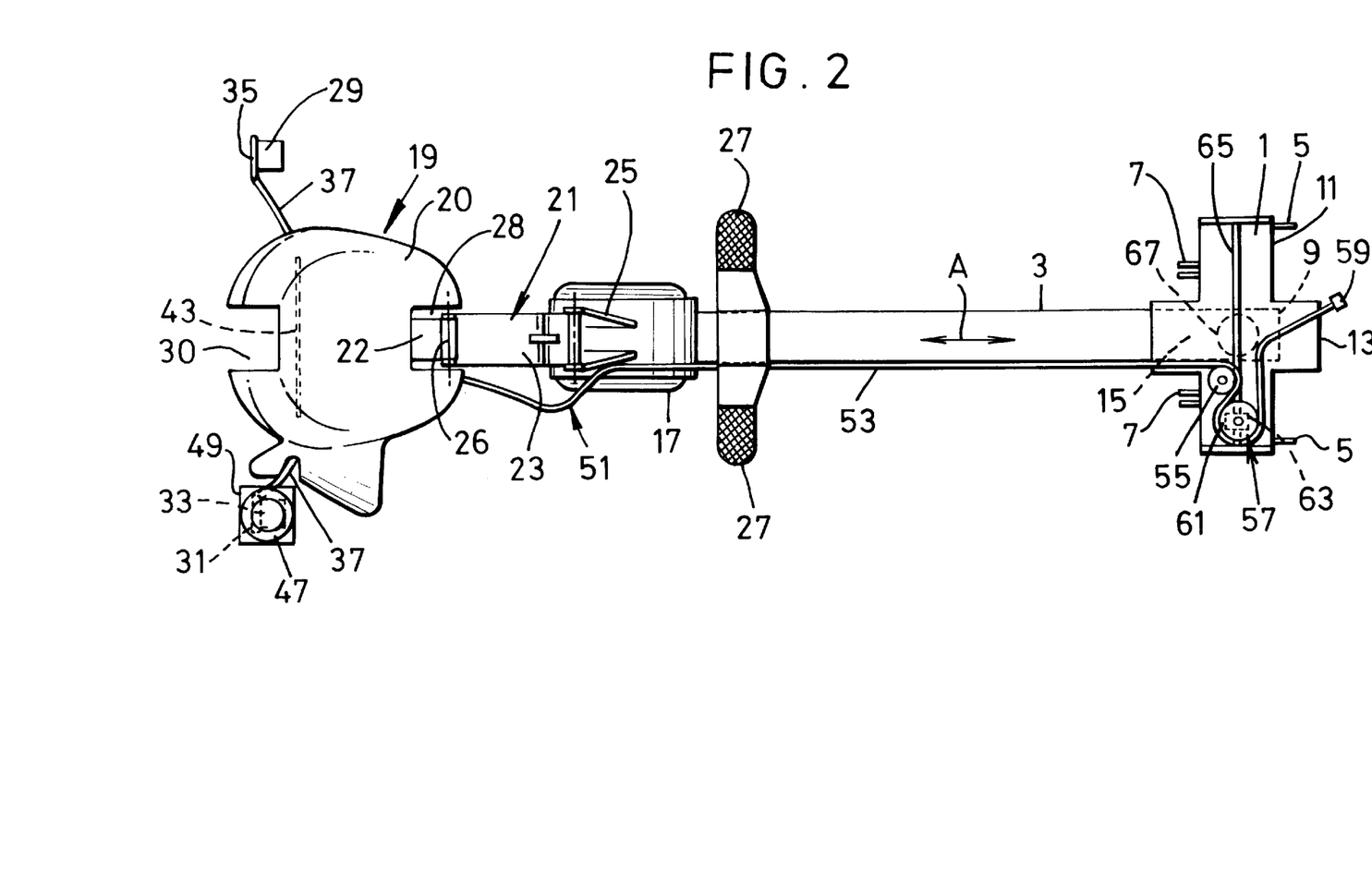
FIG. 2 is a diagrammatic plan view of the assembly with the sweeping machine not being shown.
Figure 6A:
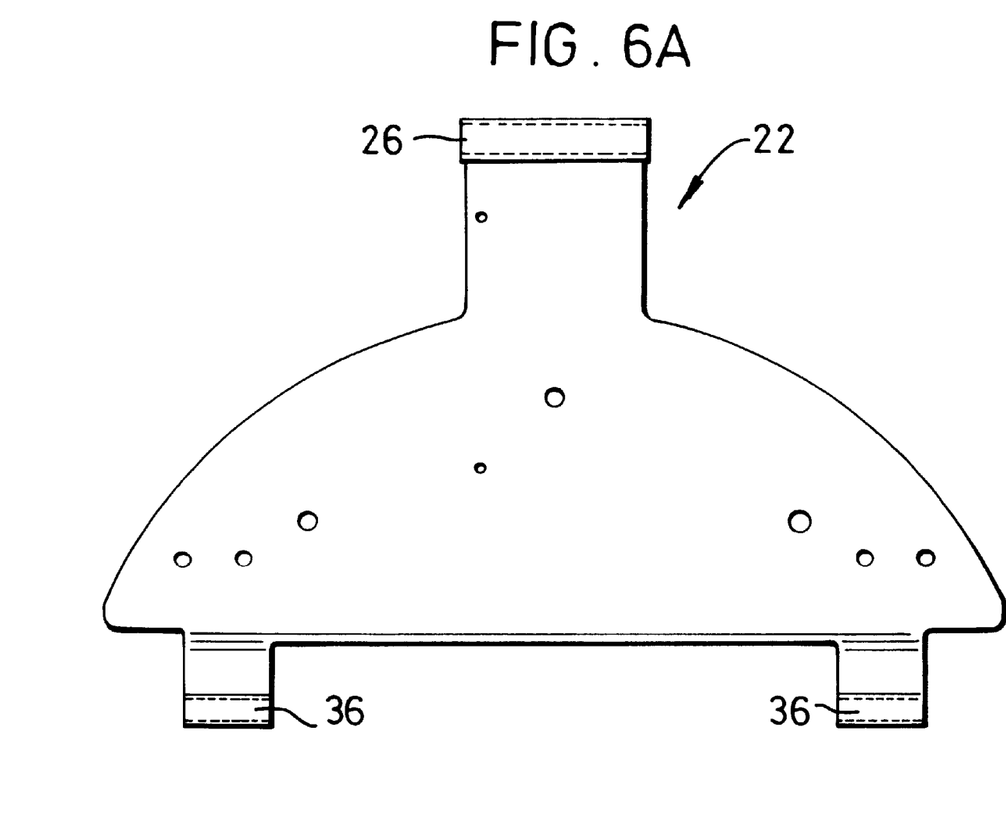
FIG. 6A is a plan view of a seat plate.
Figure 6B:
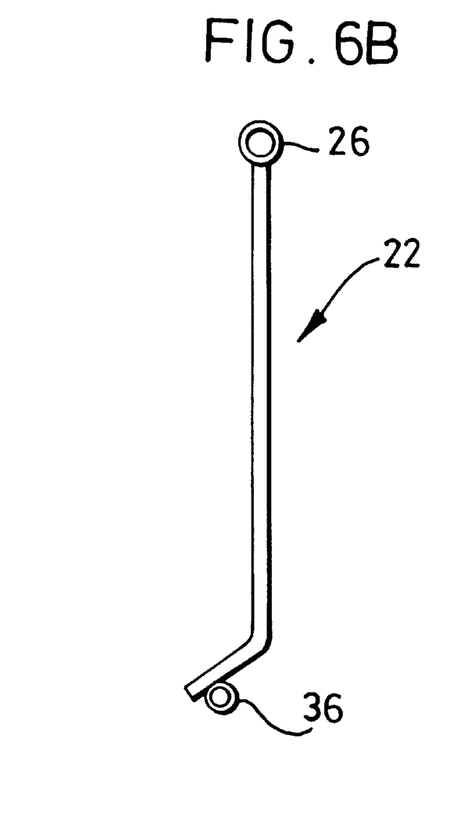
FIG. 6B is a side view of the seat plate.

Referring to FIGS. 1 and 2 of the drawings, a seat arrangement 19 comprises a telescopic chassis made up of box section metal members and having a first portion 1 adapted to be connected to the rear of a suction sweeping machine in known manner by connector means 5 and 7 and a second portion 3 slidably supported relative to the first portion 1. The seat assembly is shown with its chassis in its fully extended position with a front end 9 of the second portion 3 being illustrated in broken lines and the second portion 3 being movable relative to the first portion 1 as represented by the arrows A. The assembly is illustrated in its stowage position in dot-dash lines. As can be seen from FIG. 2, the chassis has a generally cruciform shape in plan with the first portion 1 being generally in the form of a cross and made up of a cross member 11 and a hollow longitudinal member 13 in which the front portion 15 of the second portion 3 is slidable. The second portion 3 is supported at its rear end by a caster wheel 17 and foldably connected to the rear end of the second portion 3 is the folding seat arrangement 19. The arrangement 19 has a seat 20 which is supported on a seat plate 22 (see FIGS. 6a and 6b) which is pivotally supported on a folding arm 21. The arm 21 has a limb 23 on one end of which the seat arrangement 19 is pivotally supported, the opposite end being pivotally connected to an upstand 25, which is supported on the rear of the second chassis portion 3, and supports the caster wheel 17. The seat 20 is shown in FIG. 1 in a position of use, but it can be folded to a stowed-away position by pivoting the seat clockwise about a pivot 26 formed on the seat plate 22 so that it rests against the limb 23. For this purpose, so that the seat 20 can fold flat against the limb 23, the seat is provided with two cut-away portions 28,30. Then the limb 23 is pivoted clockwise about its pivotal connection to the upstand 25, to overlie the upstand 25 and 27 are provided for an operator when he is using the seat 20.

Figure 7A:
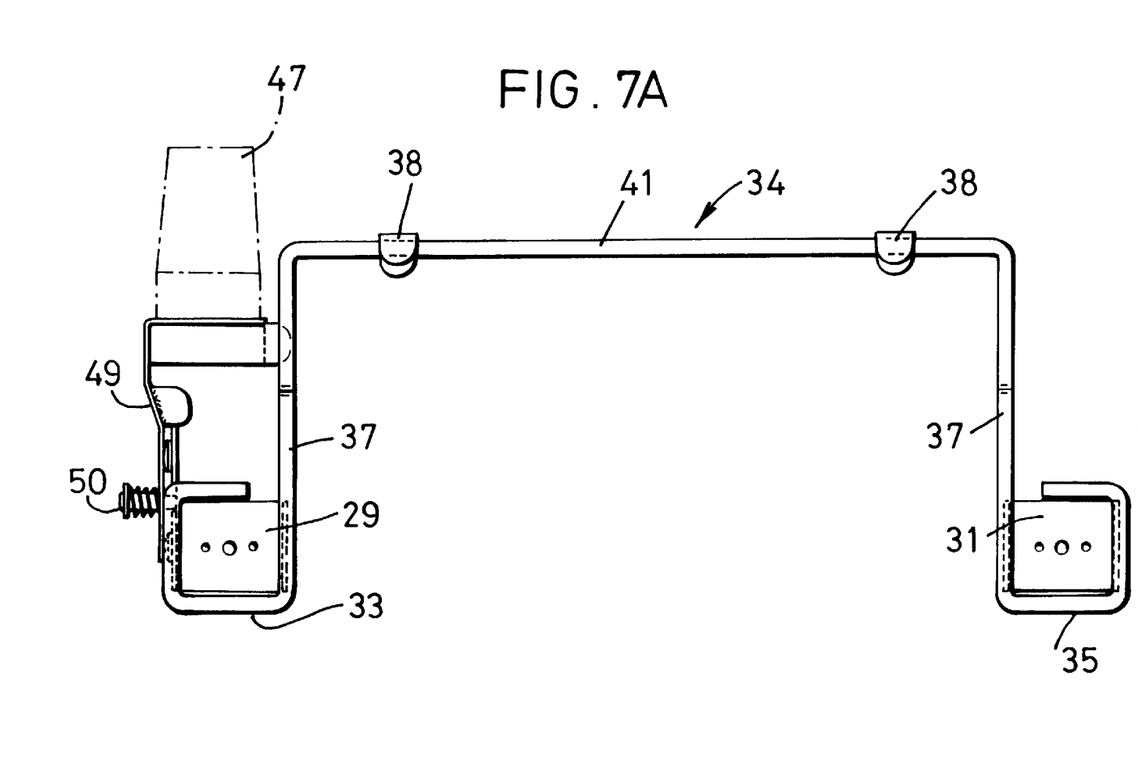
FIG. 7A is a plan view of a light frame.
Figure 7B:
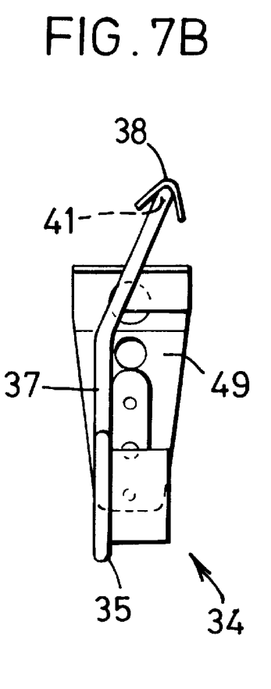
FIG. 7B is a side view of the light frame.

In accordance with the present invention, the seat assembly is provided with two rearwardly facing lights 29 and 31 supported in light holders 33 and 35 for protecting the lenses and bulbs of the lights. Each of the light holders 33 and 35 is supported on an arm 37, all of which form part of a generally U-shaped light frame 34 (see FIGS. 7A and 7B) which is pivotally supported by pivots 36 formed on the seat frame 22. As shown, the pivots 36 on the frame 22 support a transverse pivot bar 41 of the light frame 34, the bar 41 being provided with two V-shaped leaf-spring plates 38 which co-operate with cam surfaces (not shown) to hold the frame 34 in each of its extreme positions, as will herein after be described. The two rearwardly facing lights 29 and 31 are shown in FIGS. 1,2,4 and 5C in their position of use upstanding above and spaced from the support surface of the seat 20 and this is important so that when an operator is sitting on the seat 19, his jacket will not be able normally to obscure the lights. The frame 34 is held with its arms 37 upstanding due to the spring plates 38 cooperating with the cam (not shown). If the lights were merely secured to the rear of the seat 20, they would be obscured from view by the operator's coat, and in any event, would not be sufficiently high to be visible.

A registration plate 43 is pivotally supported on the transverse pivot bar 41, there being an illuminating light (not shown) provided for the plate 43 in known manner. A hazard warning light 47 which has an orange lens is pivotally supported about a pivot 50 by means of a swing bracket 49 on one of the light holders 33 or 35, this light 47 being shown in its extended position in FIG. 1.

Although it is envisaged that electrical power for each of the lights 29, 31 and 47 could be provided by one or more batteries, it is preferred that power is led to the lights from a power source on the suction sweeping machine with which the seat assembly is designed to be used and such a construction is shown in the drawings. Accordingly, electrical wiring 51 is connected to the three lights 29, 31 and 47 in known manner and then passes down the arm 21 and forwardly along the second portion of the chassis 3 as illustrated at 53, (it would be anchored to the arm 21, and to a rear part of the chassis portion 3) the wiring then extending around a pulley 55 on the first chassis portion 1 and around a dolly shown generally at 57, (and it would also be anchored to the chassis portion 1 at a front part thereof) and terminating beyond a front of the first chassis portion 1 in a connector 59. The dolly 57 comprises a pulley 61 mounted for rotation on a carriage 63, slidably supported on a rail 65, extending lengthwise of the cross member 11, the carriage 63 being biased by biassing means (not shown) towards the extremity of the cross member 11 as shown. This dolly 57 is provided so that when the second portion 3 of the chassis is moved to the left as shown in FIG. 2 to its fully extended position, the wiring 53 can move with it by virtue of the pulley 61 and its carriage 63 moving along the rail 65 against the spring bias towards the central position of the cross member 11 as represented by the dotted line 67.

Figure 3:
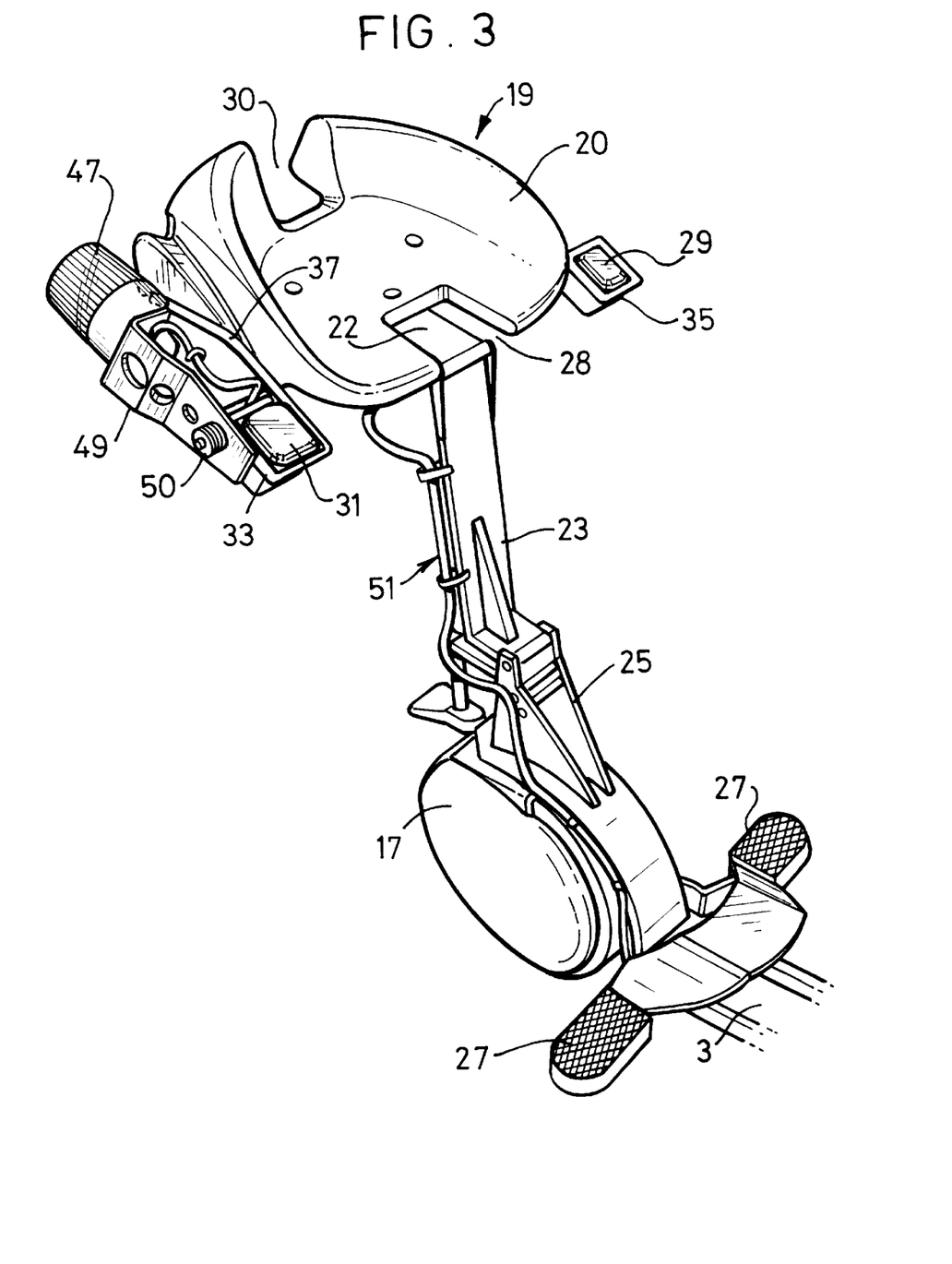
FIG. 3 is a perspective view of the assembly in its partially extended position.
Figure 4:
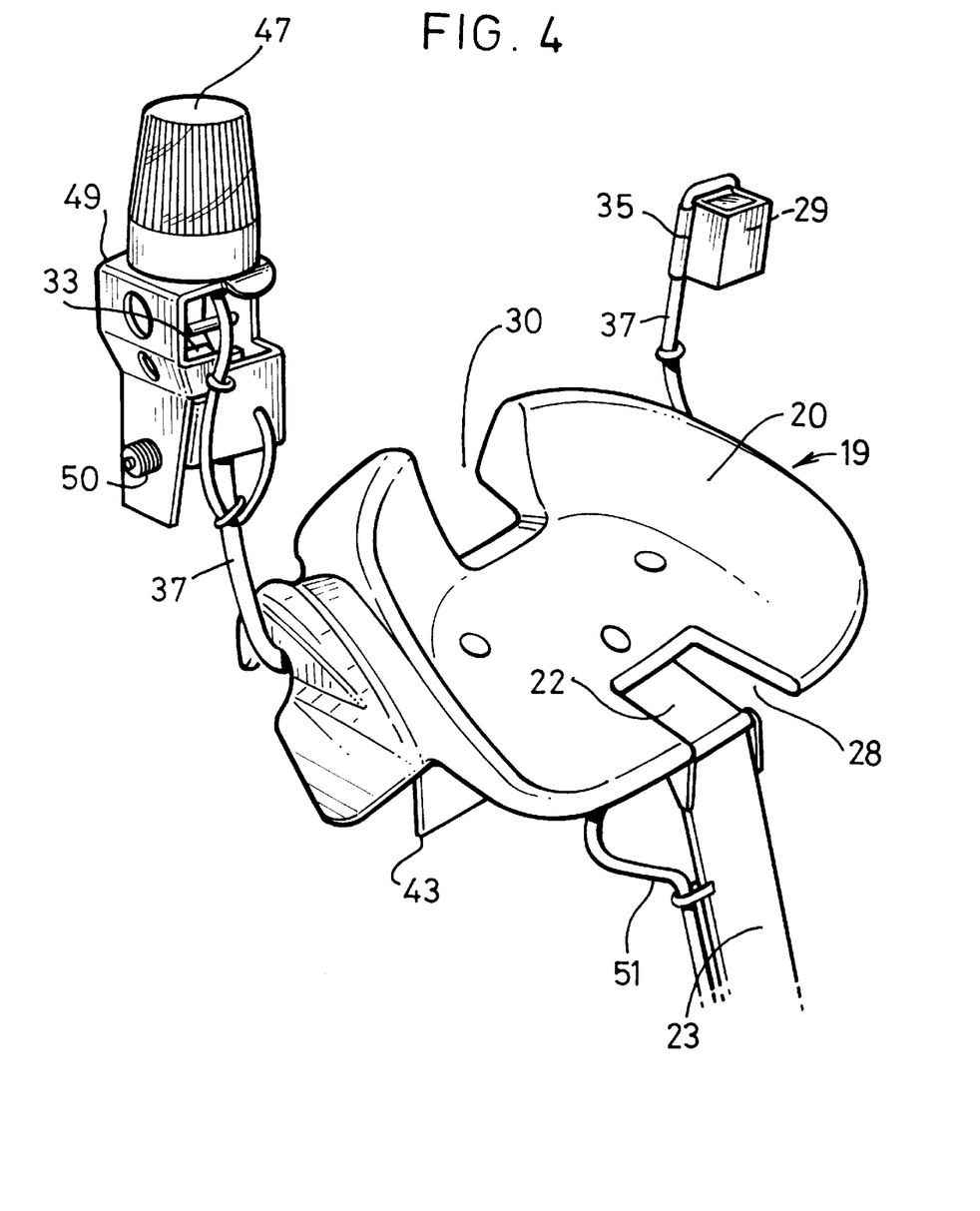
FIG. 4 is a perspective view similar to FIG. 3 but in its fully extended position with a hazard warning light shown in its position of use.
Figure 5A:
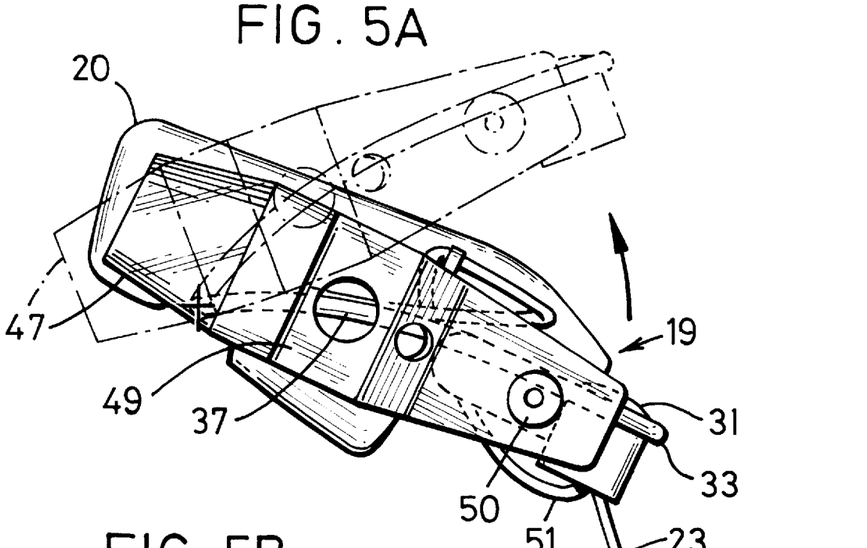
FIGS. 5A and 5B are two fragmentary side views of the assembly showing a rear light assembly in two different positions.
Figure 5B:
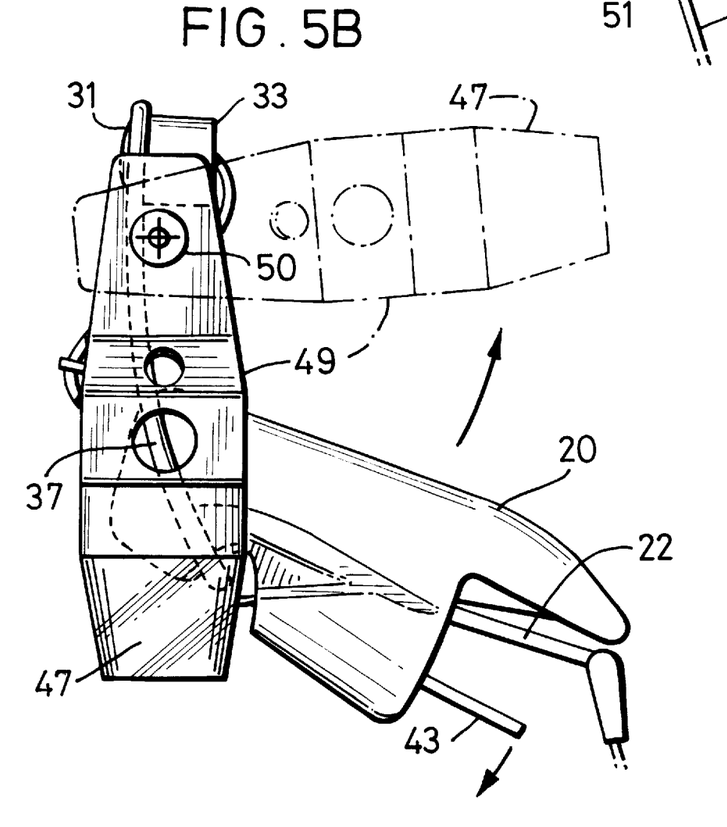
Figure 5C:
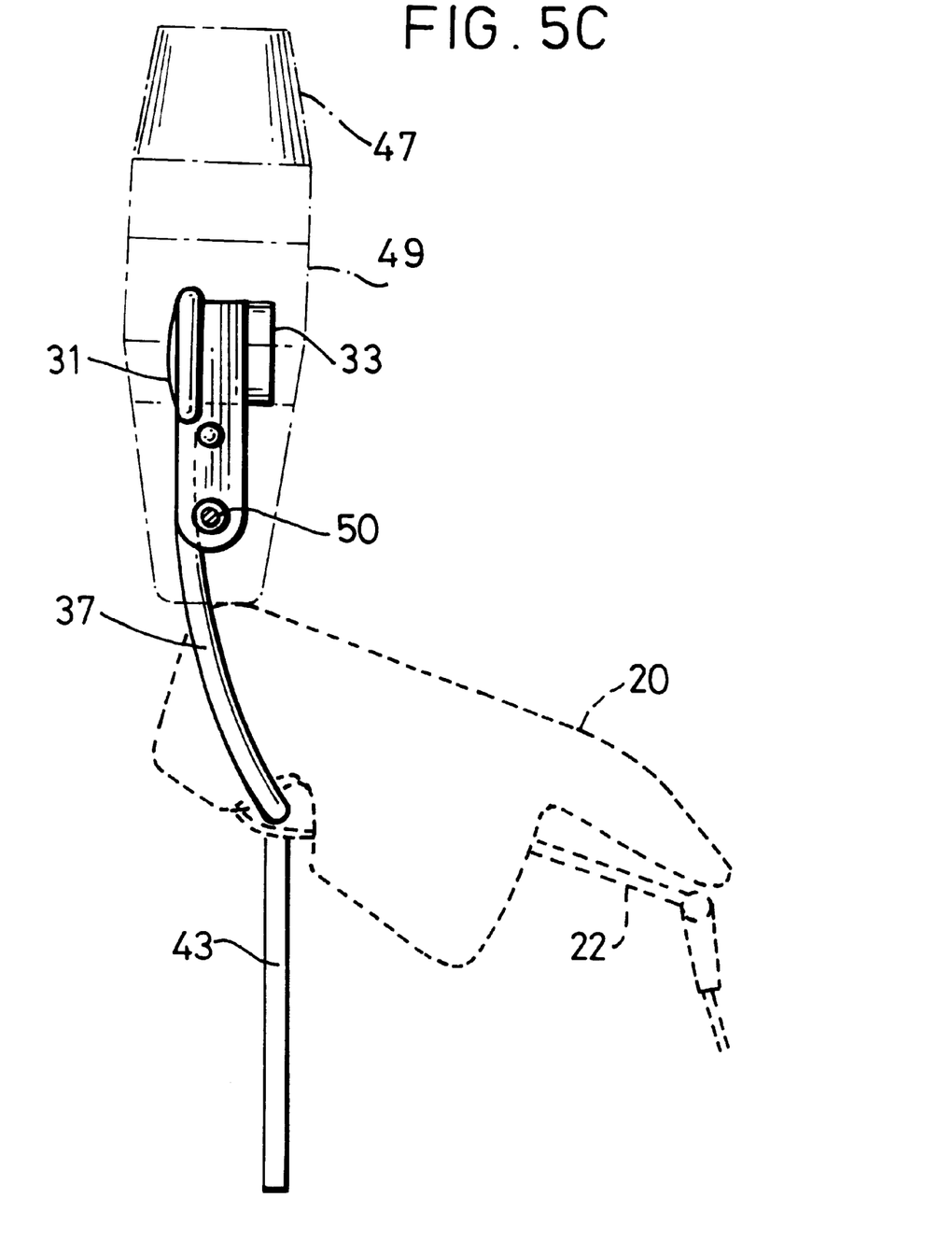
FIG. 5C is a sectional view of the assembly in its final position of use.

When it is desired to use the suction sweeping machine to which the seat assembly is adapted to be fitted in pedestrian mode, it is necessary to move the seat assembly to a fully stowed position and this is achieved by firstly folding away the hazard warning light 47 by pivoting the swing bracket 49 about its pivot 50 from its FIG. 1 position through approximately 180° (clockwise) to its FIG. 5B position so that the swing bracket 49 will lie generally alongside the support arm 37. Then each of the support arms 37 is pivoted clockwise through approximately 90°, causing the pivot bar 41 to rotate relative to pivots 36 so that the support arms 37 together with their respective lights 29 and 31 and holders 33 and 35 lie generally alongside and in the plane of the seat 19 as shown in FIGS. 3 and 5A. The lights are held with the frame 34 in this folded way position due to co-operation between the spring plates 38 and the cam (not shown). The seat 20 can then be folded to its stowed-away position by first pivoting the seat 20 and its seat plate 22 clockwise about the pivot 26 and then pivoting the limb 23 clockwise about its pivotal connection to the upstand 25, whereupon the second portion 3 of the chassis 3 can be telescoped within the longitudinal member 13 of the first portion 1. During this telescoping movement, the pulley 61 of the dolly 57 will take up any slack in the wiring 53 by moving towards the extremity of the cross member 11 under its spring bias.

It will thus be appreciated that when in their folded away and fully stowed position, each of the lights 29, 31 and 47 will lie on either side of the seat 20 and do not prevent the seat from being folded and stowed nor do they prevent the telescopic chassis from being collapsed to a stowed position. However, when in their position of use, the rearwardly facing lights 29 and 31 are located at the rearmost part of the seat assembly and comply with construction and use regulations. It should also be noted that when the lights are folded away, they fit snugly beside the seat, thus protecting them from damage.

Furthermore, the flashing or hazard warning light 47, being mounted on the swing bracket 49, is located high up so as to be visible through a wide arc. Furthermore, the registration plate 43 is located right at the rear of the seat assembly so as to be visible during use and when the seat 20 is folded to a stowage position, by being supported on the pivot bar 41, the registration plate can swing to a position flush with the underside of the seat.

It will of course be understood that the present invention has been described above purely by way of example, and modifications of detail can be made within the scope of the invention.

What is claimed is:

1. A seat assembly for a pedestrian operable suction sweeping machine, the seat assembly comprising a chassis, connector means at or adjacent the front of the chassis by which the chassis is connectable to the machine, a seat supported on the chassis, and a support wheel carried by the chassis, wherein two rearwardly facing lights are mounted on respective support arms of a generally U-shaped frame that is pivotally attached to the seat such that the generally U-shaped frame moves with respect to the seat from an upstanding extended, operative position to a folded, stowed-away position, the support arms of the generally U-shaped frame and the respective lights mounted thereon being located on each side of the seat, and wherein the folded, stowed away position of the generally U-shaped frame is such that the lights are located alongside and in a plane of the seat whereby the seat can be moved to its folded away position.

2. A seat assembly for a pedestrian operable suction sweeping machine, the seat assembly comprising a chassis, connector means at or adjacent the front of the chassis by which the chassis is connectable to the machine, a seat supported on the chassis, a support wheel carried by the chassis and two rearwardly facing lights pivotally supported on the seat and movable with respect to the seat between an operative position and a stowed-away position, wherein the lights are connected to electrical wires supported on the chassis, and the seat assembly comprises storage means on the chassis to accommodate the wiring when the chassis is moved between a towed position and a position of use, the storage means comprising a pulley around which the electrical wiring is entrained, the pulley being supported on a spring loaded dolly carried by the chassis.

3. A seat assembly according to claim 2 wherein the dolly comprises a rail extending lengthwise of the cross member, a carriage on the rail on which carriage the pulley is supported and biasing means biassing the carriage to one end of the rail.

4. A seat assembly for a pedestrian operable suction sweeping machine, the seat assembly comprising a chassis, connector means at or adjacent the front of the chassis by which the chassis is connectable to the machine, a seat supported on the chassis, and a support wheel carried by the chassis, wherein the two rearwardly facing lights are mounted on respective support arms of a generally U-shaped frame that is pivotally attached to the seat such that the generally U-shaped frame moves with respect to the seat from an upstanding extended, operative position to a folded, stowed-away position in which the seat can be moved to its folded away position, the support arms of the generally U-shaped frame and the respective lights mounted thereon being located on each side of the seat, and wherein the seat assembly further comprises a hazard warning light provided on a swing bracket supported on one of the support arms, and the swing bracket pivots through approximately 180° on said support arm.

5. A seat assembly for a pedestrian operable suction sweeping machine, the seat assembly comprising a chassis, connector means at or adjacent the front of the chassis by which the chassis is connectable to the machine, a seat supported on the chassis, and a support wheel carried by the chassis, wherein two rearwardly facing lights are mounted on respective support arms of a generally U-shaped frame that is pivotally attached to the seat such that the generally U-shaped frame moves with respect to the seat from an upstanding extended, operative position to a folded, stowed-away position, the support arms of the generally U-shaped frame and the respective lights mounted thereon being located on each side of the seat, and wherein the lights are connected to electrical wires supported on the chassis, and the seat assembly comprises storage means on the chassis to accommodate the wiring when the chassis is moved between a towed position and a position of use, the storage means comprising a pulley around which the electrical wiring is entrained, the pulley being supported on a spring loaded dolly carried by the chassis.

* * * * *